United States Patent

[11] 3,585,267

| | | | |
|---|---|---|---|
| [72] | Inventor | Derek Obersby | |
| | | Hillcroft Park, England | |
| [21] | Appl. No. | 799,268 | |
| [22] | Filed | Feb. 14, 1969 | |
| [45] | Patented | June 15, 1971 | |
| [73] | Assignee | Quickfit & Quartz Limited | |
| | | Stone, Staffordshire, England | |
| [32] | Priority | Feb. 20, 1968 | |
| [33] | | Great Britain | |
| [31] | | 8274/68 | |

[54] ELECTRONIC CIRCUITS FOR TEMPERATURE CONTROL
8 Claims, 1 Drawing Fig.

[52] U.S. Cl............................................. 13/6, 13/24
[51] Int. Cl............................................. C03b 5/02, H05b 3/62
[50] Field of Search............................................. 13/6, 24; 219/494, 497, 501

[56] References Cited
UNITED STATES PATENTS
2,857,501   10/1958   Nitsche ......................... 13/6 X
3,103,573   9/1963    Niehaus......................... 13/24 X Primary Examiner—Bernard A. Gilheany
Assistant Examiner—Roy N. Envall, Jr.
Attorney—Morrison, Kennedy & Campbell ABSTRACT: A resistance path through which an electric current is passed is maintained at a desired temperature by monitoring the current through the path, developing a signal which is indicative of the reciprocal of the current, multiplying this signal by a signal which is indicative of the voltage across the path to provide a signal representative of the resistance of the path, and comparing the signal representative of the resistance with a reference signal to provide an error signal which is used to control the flow of current through the path.

PATENTED JUN 15 1971
3,585,267
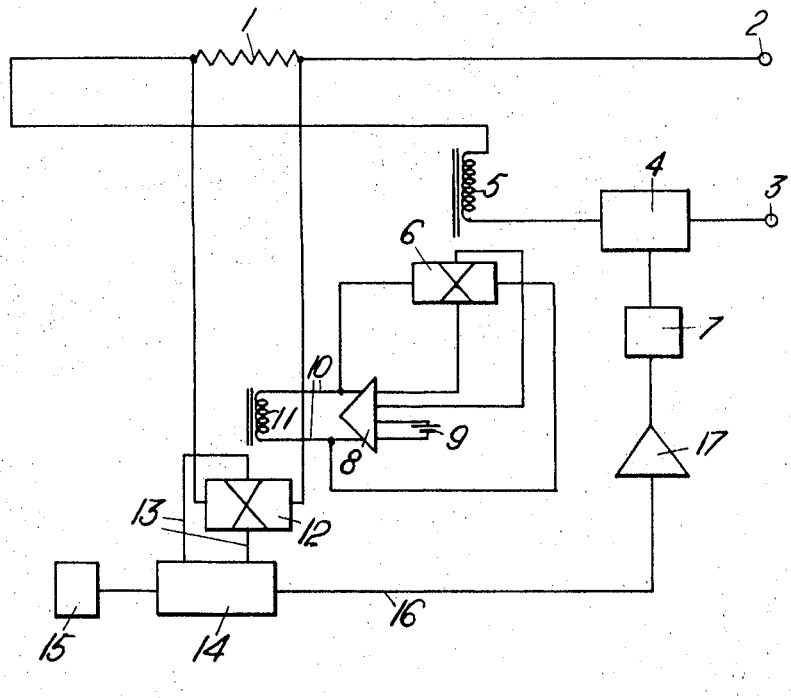
Inventor
Derek Obersby
By
Marrison, Kennedy + Campbell
Attorneys

ELECTRONIC CIRCUITS FOR TEMPERATURE CONTROL

BACKGROUND OF THE INVENTION

This invention relates to methods and apparatus for controlling the temperature of an electrically resistive path with a view to maintaining that electrically resistive path at a desired temperature.

The invention is applicable wherever it is desired to maintain an electrically resistive path at a desired temperature and has been specifically devised for the control of industrial process in which electrical resistance heating is employed, for example in glass manufacturing processes.

The control of the temperature of a resistive path is particularly important in applications where it is important to ensure that local overheating of the resistive path does not take place. If there is overheating then surrounding insulation may become overheated and may fail. It has been necessary hitherto to employ highly complex control devices for controlling the power supplied from the electrical source used for supplying the heating current to the resistive path.

Heat sensitive devices such as thermocouples have been employed to indicate the temperature at any one or more specified points on the resistive path or in its surroundings for example in surrounding insulation. The use of thermocouples demands extensive recording or monitoring equipment and the thermocouples may themselves influence the temperature of the path at the locality where the thermocouple is located.

It is a main object of the present invention to provide for the temperature control of an electrically resistive path in which the disadvantages of prior arrangements are minimized or eliminated.

A further object of the present invention is to provide an improved method and apparatus for maintaining an electrically resistive path at a desired temperature in particular in glass manufacturing processes where the resistive path may for example be a heating path through a body of hot glass or may be an electrical resistive element for example an electric heater in a furnace or in an annealing lehr.

SUMMARY

According to one aspect of the invention there is provided a method of maintaining an electrically resistive path at a desired temperature including the steps of sensing the voltage across that path and the current being supplied to the path, producing a signal indicative of the reciprocal of the current, multiplying the signal indicative of the reciprocal of the current by a signal indicative of the voltage to produce a signal proportional to the resistance of the path, comparing that resistance proportional signal with a reference signal which represents the resistance of the path, at the desired temperature, producing an error signal representing any departure of the resistance of the path from the reference value, and employing the error signal to regulate the current supplied to the resistive path so as to maintain the path at the desired temperature.

As mentioned hereinabove the method is particularly advantageous in glass manufacturing processes and in particular for the control of the temperature and hence the viscosity of molten glass which is being flowed to a glass forming process, or for the control of the temperature in a glass article which is being worked while it is sufficiently hot to be manipulated for example in the formation of end joints on tubular glass articles.

From this aspect the invention provides a method of maintaining a body of hot glass at a desired viscosity including the further steps of establishing an electric current path through the hot glass to heat the glass, generating an error signal which represents any departure of the resistance of the glass in that path when at the desired viscosity from the predetermined reference value, and continuously regulating the current flow through the glass to maintain the glass at the desired viscosity.

Further, according to another aspect of the invention an electrical control circuit for maintaining an electrically resistive path at a desired temperature includes a voltage sensing device for connection across the path and operable to produce an indication of the voltage across the path, a current sensing device connected in series with the path and with a current regulating device operable to control the current supplied to the path, analogue circuits associated with the sensing devices for producing the product of the voltage with the reciprocal of the current, a comparator circuit having inputs connected to the output of one of the analogue circuits and to a reference signal generator and an error output connected to the current regulating device so as to regulate the current supply to the path in accordance with the path resistance as determined by the product of the voltage and the reciprocal of the current.

Solid state Hall effect probe devices which are commercially available have been found to be particularly satisfactory and reliable for forming the analogue circuits associated with the sensing devices for producing the product of the voltage across the resistive path with the reciprocal of the current in the path.

In a preferred circuit according to the invention the current sensing device comprises a solid state Hall effect probe device connected in series with the resistive path, and connected in the feedback loop of a high gain differential amplifier which is connected to a reference signal source and the output from which amplifier represents the reciprocal of the sensed current, the voltage sensing device comprises a second solid state Hall effect probe device connected as an analogue multiplier having a voltage input connected across the resistive path, a current input connected to the output from the differential amplifier and an output connected to the comparator to transmit continuously thereto a signal indicative of the resistance of the path.

BRIEF DESCRIPTION OF THE DRAWING

In order that the invention may be more clearly understood an embodiment thereof will now be described, by way of example, with reference to the accompanying drawing which illustrates diagrammatically an electrical control circuit according to the invention for maintaining the temperature of a resistive path at a desired value.

DESCRIPTION OF THE PREFERRED EMBODIMENT

The resistor 1 which is shown in the drawing represents an electrically resistive path whose temperature is to be maintained at a desired value. That is the resistor 1 may represent an electrical heating element mounted in a furnace, for example in a glass melting furnace or an annealing lehr or associated with any other glass working process. The resistive path may be an electrical path formed between two probe electrodes which project into a body of molten glass in order to pass heating electric current through that body, for example for maintaining the temperature and hence the desired viscosity in molten glass which is flowing along a canal connecting the forehearth of a glass melting furnace to a glass working process. In another application of the invention the resistive path may be through a glass part which is being manipulated and shaped, for example to form a sealing surface of a joint on the end of that part, electrical connection being made to either side of the hot glass part by means of flame electrodes playing on the hot glass.

Current is supplied to the resistive path 1 from terminals 2 and 3 which are connected to an electric power source in well known manner. The mean power supplied to the resistive path 1 is controlled by means of a semiconductor controlled rectifier network 4 which is connected in series with the resistive path and with an input winding 5 of a solid state Hall probe device 6 of known kind whose function is described below.

Variation of the power supplied to the resistive path 1 is achieved by controlling the instant in each half cycle of the supply on the terminals 2 and 3 at which the control rectifier in the network 4 is fired. The firing of the rectifier is under control of a pulse generator 7 of suitable kind which produces a steep leading edge pulse which is of sufficient magnitude to ensure accurate firing of the semiconductor controlled rectifier network.

The current being supplied to the resistive path 1 is continuously sensed by the first Hall probe device 6 whose input winding 5 is connected in series with the resistive path 1.

The Hall probe device 6 is connected as an analogue inverter being associated with a differential amplifier 8. The Hall probe device is connected in the feedback loop of the amplifier and the amplifier is supplied with a standard voltage from a source 9. The output from the differential amplifier on lines 10 is a signal indicative of the reciprocal of the current flowing through the input winding 5 of the Hall probe device. This signal which is proportional to the reciprocal of the current is continuously multiplied by a second solid state Hall probe device connected as an analogue multiplier with a signal proportional to the voltage across the resistive path. The output signal from the differential amplifier 8 on lines 10 is connected to the input winding 11 of the second Hall probe device 12 which is connected in parallel with the electrical resistive path 1. The output from the Hall probe device on lines 13 is proportional to the resistance of the path since the effect of the multiplying circuit incorporating the second Hall probe device 12 is to multiply the two signal inputs and produce a signal proportional to the resistance of the path. The second Hall probe device acts both to sense the voltage across the resistive path and to produce a continuous indication of that voltage which is computed with the current reciprocal signal in the multiplying circuit.

The output from the second Hall probe device on lines 13 is fed to a comparator circuit 14 in which that signal proportional to the resistance of the path is compared continuously with a reference signal which is supplied to the comparator device 14 from a reference signal generator 15. The reference signal represents the resistance of the path 1 at the desired temperature. This resistance being known from previous calibration and the generator 15 is set to give a signal representative of the desired temperature to be maintained in the path 1. The output from the comparator is a continuous error signal on line 16 and the presence of a signal on line 16, which signal may be positive or negative with reference to the reference signal produced by the generator 15, indicates that the temperature of the resistive path 1 is higher or lower than the desired temperature, and correction of that temperature is achieved by controlling the current supply.

The error signal on line 16 is fed to an amplifier 17 and the amplified signal is employed to control the pulse generator 7 which then, through the rectifier network 4, controls the current supplied to the resistive path in such a way as to permit that path to return to the desired temperature. The pulse generator may be controlled by the error signal, for example, by varying the phase or frequency of its output signal so that the semiconductor controlled rectifier is caused to conduct over a shorter or longer period according to the magnitude and sign of the error signal.

As already mentioned the electrical circuit according to the invention may be employed for controlling a body of hot glass so as to maintain that glass at a desired viscosity and for example the control may be of the softening or melting of glass and in these cases the glass itself forms the resistive element. Thus control of glass milling or manipulation techniques may be achieved by the method of the invention or any process in which molten glass is handled may be controlled.

Another use of the invention is in the pipe manufacturing industry to control the temperature of the pipes for the bending or drawing of pipes. Also the temperature of a resistive element wound around a pipe may be accurately controlled when very fine control is desired of the temperature of a liquid flowing through the pipe for example in the pharmaceutical manufacturing industry.

Further use of the invention is in electrophoresis instruments in which an electrolyte forms the electrical resistance path variations in which resistance control a process to be regulated.

In the particular embodiment described Hall effect probe devices are used for sensing the current flow and producing a signal indicative of the reciprocal of the current and for multiplying this indicative signal by a signal indicative of the voltage and these devices have the advantages that they are robust and contain no moving parts, that they are able to detect very small changes in load, that they are quick acting and that they can be operated continuously. However, it is not essential to employ Hall effect probe devices in the operation of this invention or even to employ continuously operating devices for performing the functions carried by the Hall effect probe devices since they may be carried out discontinuously. Similarly it is possible for the error signal on the line 16 from the comparator circuit 14 to be discontinuous.

We claim:

1. A method of maintaining an electrically resistive path at a desired temperature, including the steps of sensing voltage across that path and the current being supplied to the path, producing a signal indicative of the reciprocal of the current, multiplying the signal indicative of the reciprocal of the current by a signal indicative of the voltage to produce a signal proportional to the resistance of the path, comparing that resistance proportional signal with a reference signal which represents the resistance of the path at the desired temperature, producing an error signal representing any departure of the resistance of the path from the reference value, and employing the error signal to regulate the current supplied to the resistive path so as to maintain the path at the desired temperature.

2. A method according to claim 1, of maintaining a body of hot glass at a desired viscosity, including the steps of establishing an electric current path through the hot glass to heat the glass, generating an error signal which represents any departure of the resistance of the glass in that path when at the desired viscosity from the predetermined reference value, and continuously regulating the current flow through the glass to maintain the glass at the desired viscosity.

3. A method according to claim 1 in which the voltage and the current supplied to the path are sensed continuously, the signal indicative of the reciprocal of the current is multiplied continuously by the signal indicative of the voltage and the signal proportional to the resistance of the path is compared continuously with the reference signal.

4. An electrical control circuit for maintaining an electrically resistive path at a desired temperature, including a voltage sensing device for connection across the path and operable to produce an indication of the voltage across the path, a current sensing device connected in series with the path and with a current regulating device operable to control the current supplied to the path, analogue circuits associated with the sensing devices for producing the product of the voltage with the reciprocal of the current, a comparator circuit having inputs connected to the output of one of the analogue circuits and to a reference signal generator and an error output connected to the current regulating device so as to regulate the current supply to the path in accordance with the path resistance as determined by the product of the voltage and the reciprocal of the current.

5. A control circuit according to claim 4, wherein the current sensing device includes a solid state Hall effect device having an input connected in series with the resistive path, and being connected in the feedback loop of a high gain differential amplifier which is connected to a reference signal source to provide an analogue inverter, the output from the amplifier representing the reciprocal of the sensed current, and the voltage sensing device includes a second solid state Hall effect device connected as an analogue multiplier having a voltage input connected across the resistive path, a current input connected to the output from the differential amplifier and an output connected to the comparator in order to transmit thereto a signal indicative of the resistance of the path.

6. A control circuit according to claim 4, wherein the current regulating device is controlled by the output from a pulse generator.

7. A control circuit according to claim 4, wherein continuous indications are obtained of the voltage across and the current passing through the path.

8. A control circuit according to claim 4, wherein the error output from the comparator circuit is continuous.